United States Patent
Fano (10) Patent No.: US 10,755,196 B2
(45) Date of Patent: Aug. 25, 2020

(54) DETERMINING RETRAINING OF PREDICTIVE MODELS

(71) Applicant: Accenture Global Solutions Limited, Dublin (IE)

(72) Inventor: Andrew E. Fano, Lincolnshire, IL (US)

(73) Assignee: Accenture Global Solutions Limited, Dublin (IE)

( * ) Notice: Subject to any disclaimer, the term of this patent is extended or adjusted under 35 U.S.C. 154(b) by 1130 days.

(21) Appl. No.: 15/148,223

(22) Filed: May 6, 2016

(65) Prior Publication Data

US 2017/0323216 A1    Nov. 9, 2017

(51) Int. Cl.
| | |
|---|---|
| G06N 3/04 | (2006.01) |
| G06N 3/08 | (2006.01) |
| G06K 9/00 | (2006.01) |
| G06F 15/17 | (2006.01) |
| G06N 20/00 | (2019.01) |
| G06Q 10/06 | (2012.01) |

(52) U.S. Cl.
CPC ........... *G06N 20/00* (2019.01); *G06Q 10/067* (2013.01)

(58) Field of Classification Search
CPC .............................. G06N 20/00; G06Q 10/067
USPC ........................................................ 706/1–62
See application file for complete search history.

(56) References Cited

U.S. PATENT DOCUMENTS

| | | | |
|---|---|---|---|
| 7,937,350 B2 | 5/2011 | Lingenfelder | |
| 8,250,009 B1 | 8/2012 | Breckenridge | |
| 8,533,224 B2 | 9/2013 | Lin | |
| 9,990,365 B1* | 6/2018 | Kilpatrick | G06F 16/119 |
| 10,244,041 B2* | 3/2019 | Kim | H04L 67/10 |
| 10,366,054 B2* | 7/2019 | Molnar | G06F 16/168 |
| 2015/0348065 A1* | 12/2015 | Doganata | G06Q 30/0202 |
| | | | 705/7.31 |

OTHER PUBLICATIONS

Mert Akdere et al., "The Case for Predictive Database Systems: Opportunities and Challenges," Department of Computer Science, Brown University, Providence, RI, {makdere, ugur, matteo, eli, sbz}@cs.brown.edu, 8 pages.

"A mathematician at risk: How often should you retrain your model?," [online]. [Retrieved from the Internet] http://blog.noblemail.ca/2014/03/how-often-should-you-retrain-your-model.html, May 5, 2016, 4 pages.

(Continued)

*Primary Examiner* — Brandon S Cole
(74) *Attorney, Agent, or Firm* — Fish & Richardson P.C.

(57) ABSTRACT

Methods, systems, and apparatus, including computer programs encoded on a computer storage medium, for determining retraining predictive models. One of the methods includes maintaining, by a computer system of an enterprise, one or more predictive models. The computer system receives operational data and uses each of the one or more predictive models to generate predictions using the received operational data. An indication of a systemic change in the computer system is received. The method includes determining that one or more retraining rules specify that at least one of the one or more predictive models should be retrained due to the systemic change, and in response, obtaining updated training data and retraining the predictive model using the updated training data.

20 Claims, 4 Drawing Sheets

(56) References Cited

OTHER PUBLICATIONS

RaymondL, "Retrain Machine Learning models programmatically | Microsoft Azure," https://azure.microsoft.com/en-us/documentation/articles/machine-learning-retrain-models- . . . May 5, 2016, 9 pages.

* cited by examiner

DETERMINING RETRAINING OF PREDICTIVE MODELS

BACKGROUND

Machine learning techniques can be used to discover patterns in data, and to construct mathematical models based on the discovered patterns. The models can then be applied to make predictions on future data. Training a machine learning model can involve providing a machine learning algorithm with training data that includes a correct answer (e.g., a binary value, such as whether a machine part failed or not, whether a customer defaulted or not, etc.), which may be referred to as a target attribute. The machine learning algorithm discovers patterns in the training data that map input data attributes (e.g., other attributes of the machine part, the customer, etc.) to the target attribute (i.e., the answer to be predicted) and outputs a machine learning model that includes the patterns (e.g., a classifier).

SUMMARY

Implementations of the present disclosure include computer-implemented methods for determining retraining of predictive models. In some implementations, actions include maintaining, by a computer system of an enterprise, one or more predictive models. The computer system receives operational data and uses each of the one or more predictive models to generate predictions using the received operational data. An indication of a systemic change in the computer system is received. The actions include determining that one or more retraining rules specify that at least one of the one or more predictive models should be retrained due to the systemic change, and in response, obtaining updated training data and retraining the predictive model using the updated training data. Other implementations of this aspect include corresponding systems, apparatus, and computer programs, configured to perform the actions of the methods, encoded on computer storage devices.

These and other implementations can each optionally include one or more of the following features. The systemic change can include a change to data governance policies of the enterprise. Data governance policies of the enterprise can include data definitions, data quality standards, and processes for data management. The systemic change can include a change to business data associated with the received operational data. The systemic change can include a change in the computer system exclusive of the received operational data. A determination can be made of whether a performance of the retrained predictive model satisfies a threshold. When the performance of the retrained predictive model does not satisfy the threshold, the one or more retraining rules can be updated. Retraining the predictive model using the updated training data can include partially retraining the predictive model and assessing a performance of the partially retrained predictive model. Obtaining updated training data can include gathering new training examples from operational data that has changed from previously received operational data.

In some implementations, actions include maintaining, by a computer system of an enterprise, one or more predictive models. The computer system uses each of the one or more predictive models to generate predictions using received operational data. An indication of a change in the operational data is received. A measure of impact of the change in the operational data is computed. The actions include determining that one or more retraining rules specify that at least one of the one or more predictive models should be retrained due to the measure of impact of the change in the operational data, and in response, obtaining updated training data and retraining the predictive model using the updated training data. Other implementations of this aspect include corresponding systems, apparatus, and computer programs, configured to perform the actions of the methods, encoded on computer storage devices.

These and other implementations can each optionally include one or more of the following features. Computing the measure of impact of the change in the operational data can be based on one or more changes to values of features of the operational data. Updated operational data can be received and compared to previous training data on which the one or more predictive models had been trained. The one or more retraining rules can be updated, based on the measure of impact of the change in the operational data. A determination can be made of whether a performance of the retrained predictive model satisfies a threshold. When the performance of the retrained predictive model does not satisfy the threshold, the one or more retraining rules can be updated. Retraining the predictive model using the updated training data can include partially retraining the predictive model and assessing a performance of the partially retrained predictive model. Obtaining updated training data can include gathering new training examples from operational data that has changed from previously received operational data.

Implementations of the present disclosure provide one or more of the following advantages. As retraining predictive models may be a time and labor-intensive process, objectively and automatically determining whether a predictive model is likely to benefit from retraining can save time and labor. Rather than add features (and complexity) to a predictive model, the model can be retrained at appropriate times. A predictive model can be partially retrained and a performance of the partially retrained model can be evaluated to determine whether it is worthwhile to use human and computer resources to fully retrain the model. A risk of applying obsolete models can be reduced.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Machine learning techniques can be used to build predictive models (e.g., classifiers) that rely on training data. For example, classifiers can be produced by analyzing training data (e.g., examples of categories in question in which the categories they belong to are known). The classifiers may then be used to estimate the probability that an unlabeled example (e.g., an entity for which the category is unknown) belongs to one of the categories learned by the system. The predictive models (e.g., classifiers) may perform well after training, but the performance of the models may degrade over time for various reasons. Many of the reasons may be related to the context in which they are being applied. For example, aspects of the population of entities the model is being applied to may have changed. As another example, the definition of certain aspects of the data may have evolved. The system and techniques described in this document can define and detect specific circumstances that can indicate whether predictive models may benefit from retraining.

In general, predictive models (e.g., classifiers) are based on data collected under certain assumptions. To make a particular type of prediction, (e.g., a prediction of a particular type of fault, such as a water pump failure in a particular type of machine), a predictive model may be generated using data associated with a subject of the prediction (e.g., data associated with machines manufactured with factory equipment of certain types, configured with a given set of settings, including a given set of processes, distributed through certain channels, and used by certain customers). Many events may occur that are not captured in the data used for training the predictive model itself, yet the events may have some bearing on the performance of existing models. For example, manufacturing processes may change, companies involved in manufacturing, configuring, or distributing a machine may merge, data systems may be integrated, and so forth. By retraining predictive models when appropriate, for example, the risk of applying obsolete models can be reduced.

Implementations of the present disclosure are generally directed to determining whether predictive models are to be retrained, and if so, retraining the models. In some implementations, the predictive models are maintained by a computer system of an enterprise (e.g., a business, a government institution, or another sort of organization). Changes to the enterprise's governance data, operational data, and business data can be monitored, and a set of rules can be applied to trigger retraining of relevant predictive models. As retraining predictive models (e.g., assigning a classification to a particular subject, such as whether a machine's water pump has failed) may be a time and labor-intensive process, objectively and automatically determining whether a predictive model is likely to benefit from retraining can save computer processing power, time, and human labor.

Figure 1:
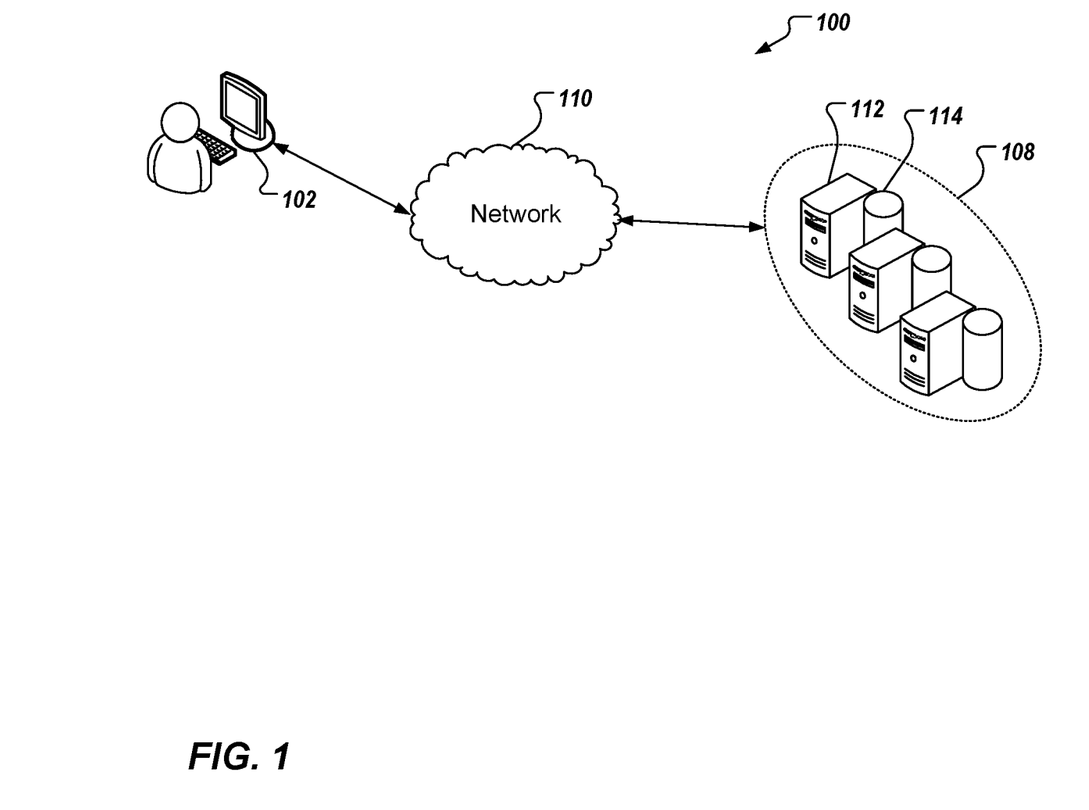
FIG. 1 depicts an example system that can execute implementations of the present disclosure.

FIG. 1 depicts an example system 100 that can execute implementations of the present disclosure. In the depicted example, the system 100 includes a computing device 102 that communicates with a server system 108 over a network 110. A user of the computing device 102, for example, can apply predictive models trained by the server system 108 to generate predictions using enterprise data maintained by the system. For example, the user can be a data analyst, an engineer, or another sort of employee inside or outside of an enterprise, who can access the predictive models trained by the server system 108.

In some implementations, the computing device 102 can represent various forms of processing devices including, but not limited to, a desktop computer, a laptop computer, a tablet computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. As discussed in further detail herein, the computing device 102 can interact with software executed by the server system 108.

In some implementations, the server system 108 can include one or more servers 112 and databases 114. In some examples, the servers 112 can represent various forms of servers including, but not limited to a web server, an application server, a proxy server, a network server, or a server farm. For example, the servers 112 can be application servers that execute software accessed by computing devices 102, 104. In operation, multiple computing devices 102, 104 (e.g., clients) can communicate with the servers 112 by way of the network 110. In some implementations, a user can invoke applications available on the servers 112 in a user-interface application (e.g., a web browser) running on the computing device 102. Each application can individually access data from one or more repository resources (e.g., databases 114).

In some implementations, the system 100 can be a distributed client/server system that spans one or more networks such as network 110. The network 110 can be a large computer network, such as a local area network (LAN), wide area network (WAN), the Internet, a cellular network, or a combination thereof connecting any number of mobile clients, fixed clients, and servers. In some implementations, each client (e.g., computing device 102) can communicate with the server system 108 through a virtual private network (VPN), Secure Shell (SSH) tunnel, or other secure network connection. In some implementations, the network 110 can include the Internet, a wireless service network, and may include the Public Switched Telephone Network (PSTN). In other implementations, the network 110 may include a corporate network (e.g., an intranet) and one or more wireless access points.

Implementations of the present disclosure described in this specification relate to examples for a manufacturing company, which is a non-limiting, example context. Other implementations of the present disclosure are also applicable in other contexts and/or with other data and/or industries. Other example data can include data in a business context (e.g., accounting, sales, marketing, financing, procurement).

Figure 2:
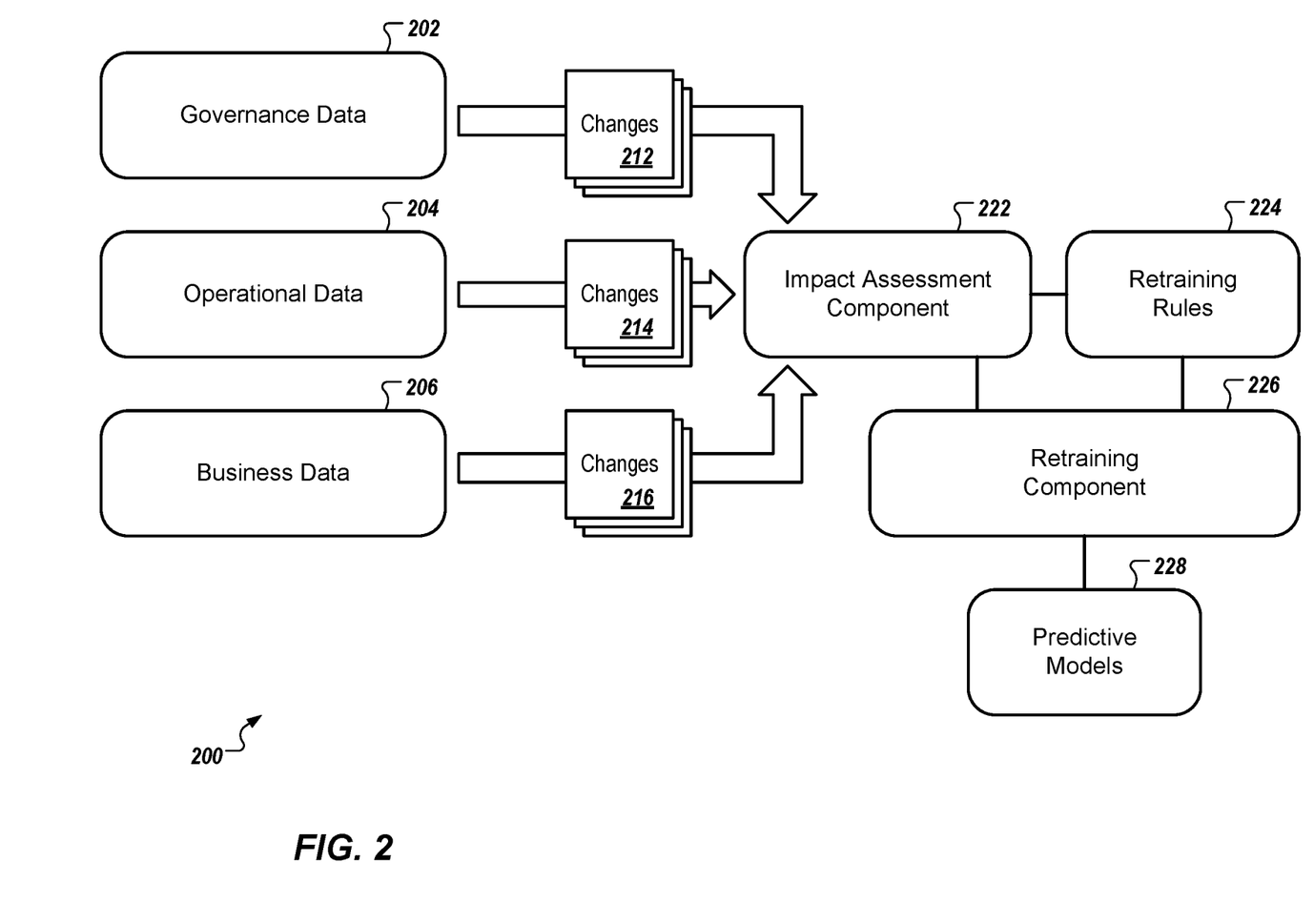
FIG. 2 depicts an example environment in which an assessment of whether to retrain predictive models can be made, and in which the models may be retrained.

FIG. 2 depicts an example environment 200 in which an assessment of whether to retrain predictive models can be made, and in which the models may be retrained. The example environment 200 can be implemented, for example, by the server system 108 of FIG. 1. In general, the example environment 200 maintains governance data 202, operational data 204, and business data 206 (e.g., using one or more data stores, databases, file systems, or other suitable sources of data). Changes 212, 214, and 216 to the respective data 202, 204, and 206 can be evaluated by an impact assessment component 222 (e.g., a software component, such as an application, module, service, or another suitable component). To assess the impact of any changes, for example, the impact assessment component 222 can access a library of retraining rules 224 including change conditions that indicate whether a particular predictive model is to be retrained in response to the changes. For example, a change condition can map a particular type of change to one or more relevant predictive models. If a predictive model is to be retrained, for example, a retraining component 226 can access a repository of predictive models 228, and can perform full or partial retraining of the model. As a result of retraining, for example, new or updated models can be saved to the repository of predictive models 228, and in some examples, the retraining rules 224 may be updated.

The governance data 202 and respective changes 212 can include data associated with information technology related aspects of an enterprise, such as policies, policy data definitions, business processes, process execution data, data quality rules, and data definitions. For example, if the enterprise changes how a data element is defined (e.g., a definition of what it means for a customer to pay on time), a prediction that relies on the data element may also change (e.g., a prediction of whether the customer will pay on time). Thus, a relevant predictive model may or may not continue to be reliable, and may benefit from retraining.

The operational data 204 and respective changes 214 can include data associated with the ongoing operations of an enterprise. In general, the operational data is data that is received by the organization on an ongoing basis, e.g., every day, week, month, from operations of the organization. For example, operational data of a manufacturing enterprise can include shop floor data, warranty data, and vendor performance data. As another example, operational data of a sales enterprise can include channel performance data. As another example, operational data of a marketing enterprise can include promotion performance data. As another example, operational data of a financing enterprise can include customer credit data, payment performance, and collection data. Changes 214 to the operational data 204, for example, can include instances in which the data drifts from its normal operational range. The system can continually monitor one or more characteristic metrics of the operational data. For example, the characteristic metric can be a measure of central tendency, e.g., an average value, a mean, a median, or a mode, of an individual data element or an aggregated value from multiple data elements of the operational data. These changes can occur due to various changes to an environment in which the enterprise operates. For example, if an average value of an element of the operational data 204 changes (e.g., an average age of vehicles within a vehicle fleet changes), a predictive model that relies on the data element (e.g., a model that predicts whether a vehicle will fail) may or may not continue to be reliable, and may benefit from retraining.

The business data 206 and respective changes 216 can include data that indicates changes in qualitative business aspects, which may impact a predictive model and yet are not accounted for by the model. For example, data that indicates changes in business aspects such as an enterprise's mergers/acquisitions, product changes, customer base changes, changes in business geography (e.g., opening a new location), changes in vendors and suppliers, changes in labor force, changes in regulations, and other business-related changes and events may impact a predictive model, yet may not be represented by features of the model. If a change to one or more of these aspects occurs, a predictive model that is potentially affected by the change may or may not continue to be reliable, and may benefit from retraining. For example, if an enterprise switches suppliers for a part in a machine, models that are designed to predict whether the machine needs service may benefit from retraining. As another example, if a human agent that performs enterprise-related assessments changes, models that are designed to predict the assessments may benefit from retraining.

Various types of regulatory changes may trigger the retraining of predictive models. If a regulatory change occurs in the definition of a category predicted by a model, for example, a retraining of the model may be triggered. For example, a classifier may categorize construction sites as being "safe" or "unsafe," however, the definition of these terms may change. As another example, if a regulatory change occurs that affect the use data used by a predictive model, retraining of the predictive model may be triggered. For example, a change in regulations may disallow use of data currently used by a predictive model, or may allow use of data previously disallowed. In the present example, the predictive model may be retrained to only use data that is allowed by current regulations. In general, techniques for tracking data provenance may be used to identify which models are to be retrained.

Example processes for receiving indications of change (e.g., the changes 212 in the governance data 202, the changes 214 in the operational data 204, and/or the changes 216 in the business data 206) by the impact assessment component 222, and determining whether the retraining rules 224 indicate that one or more predictive models 228 should be retrained, are described in further detail below with regard to FIGS. 3 and 4. In general, estimating the viability of a predictive model can include tracing variability of the most sensitive data fields post-event, manually testing a subset of post-event cases, and performing a historical review of similar changes and resulting impact.

Figure 3:
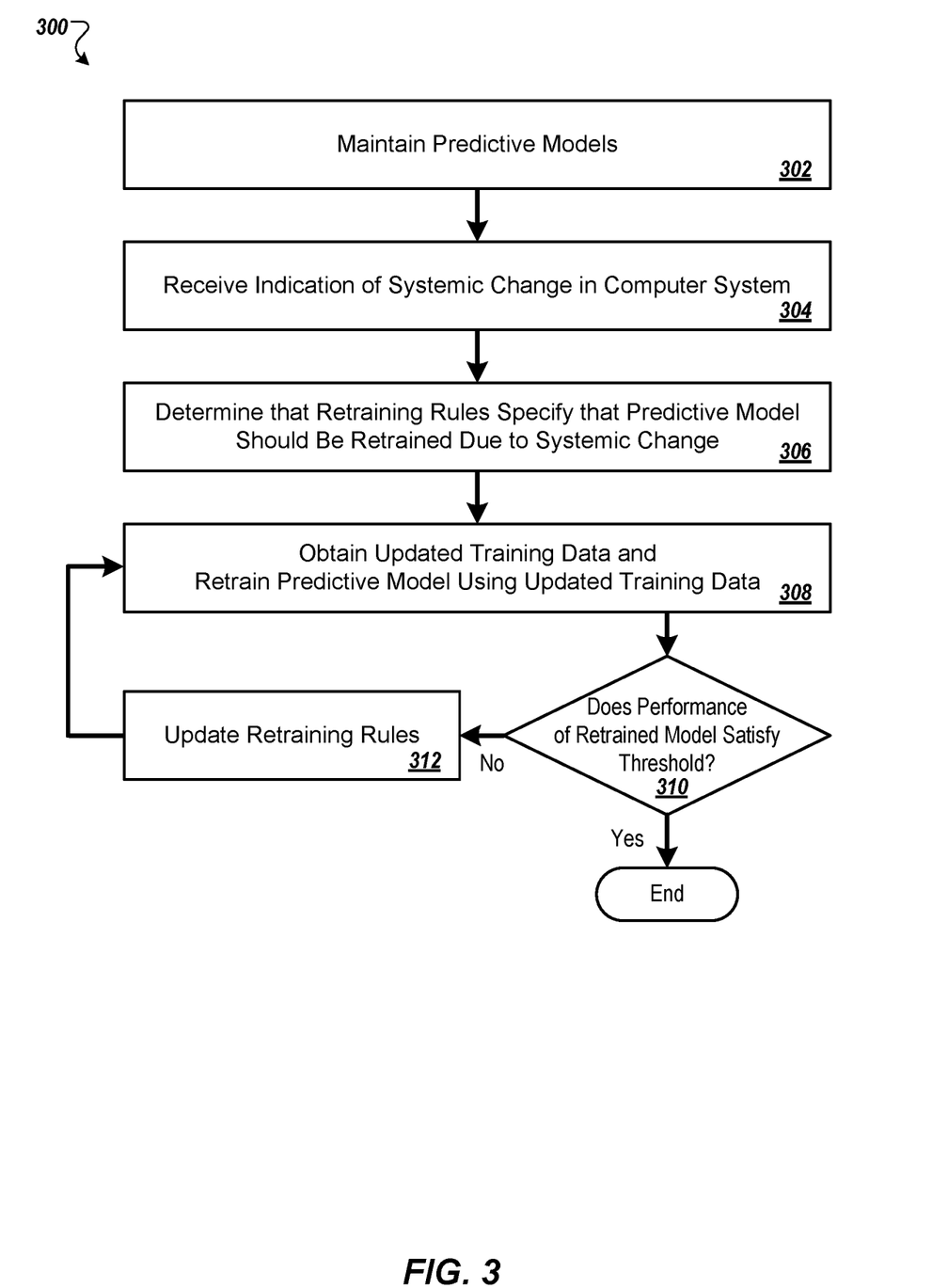
FIG. 3 depicts an example process that can be executed in implementations of the present disclosure.

FIG. 3 depicts an example process 300 that can be executed in implementations of the present disclosure. The example process 300 can be performed by an appropriately programmed system of one or more computers, for example, by the example system 100 of FIG. 1 or the example environment 200 of FIG. 2.

One or more predictive models are maintained by a computer system of an enterprise (302). For example, the predictive models 228 can be maintained by the environment 200. The computer system can receive operational data and can apply each of the one or more predictive models to generate predictions using the received operational data. For example, the server system 108 can receive the operational data 204 (e.g., data pertaining to various instances of a particular type of machine in a manufacturing environment) and can apply the predictive models 228 to generate predictions using the received data (e.g., predictions regarding whether a particular machine's water pump should be serviced).

An indication of a systemic change in the computer system is received (304). In some examples, the systemic change can include a change in the computer system related to the data governance policies or business data rather than the received operational data. For example, an indication of the systemic change received by the impact assessment component 222 can be exclusive of the operational data 204 and the changes 214 in the operational data 204. In the present example, the indication of the systemic change can exclude data such as shop floor data collected regarding operation of the machine and water pump (e.g., sensor data, log data), warranty data for the machine and water pump, and vendor performance data for the machine and water pump.

In some examples, the systemic change can include a change to data governance policies of the enterprise. For example, the impact assessment component 222 can receive the changes 212 to the governance data 202. Data governance policies of the enterprise may include data definitions, data quality standards, and processes for data management. For example, a data definition or standard regarding what qualifies as a faulty water pump for the machine may change.

In some examples, the systemic change can include a change to business data associated with the received operational data. For example, the impact assessment component 222 can receive the changes 216 to the business data 206. For example, a supplier of water pumps for the machines may change. As another example, an enterprise may experience significant turnover in staff that services the machines. As another example, a schedule for inspecting the machines may change.

A determination is made that one or more retraining rules specify that at least one of the one or more predictive models should be retrained due to the systemic change (306). For example, the impact assessment component 222 can determine that one or more of the retraining rules 224 specify that one or more of the predictive models 228 should be retrained, due to receiving an indication of a particular type of systemic change, or a combination of systemic changes. In the present example, the retraining rules 224 may include a rule that specifies that if a schedule for inspecting the machine changes, a predictive model for determining that the machine's water pump should be retrained.

In response to the determination, updated training data is obtained and the predictive model is retrained using the updated training data (308). For example, the retraining component 226 can receive updated training data, and one or more of the predictive models 228 can be retrained using the updated training data. In general, retraining a predictive model can include assessing a set of data attributes associated with a subject (e.g., a machine, a vehicle, a customer, a vendor) and specifying a value for a target attribute for the subject (e.g., labeling, by a human). Obtaining updated training data may include gathering new training examples from operational data that has changed from previously received operational data. For example, the retraining component 226 can gather new training examples from the operational data 204 that have changed from previously received operational data (e.g., data that was used to train a current version of the predictive model). In the present example, the retraining component 226 can gather new training examples related to operation of the machine that occurred since the rule for retraining the predictive model was triggered (e.g., since the schedule for inspecting the machine changed). Retrained predictive models may be stored (e.g., in the repository of predictive models 228) and/or may be evaluated to determine whether any related retraining rules 224 should be added, removed, or updated.

In some examples, retraining the predictive model using the updated training data can include partially retraining the predictive model and assessing a performance of the partially retrained predictive model. Fully retraining a predictive model, for example, may be time and resource intensive. By partially retraining the predictive model and determining whether a performance of the partially retrained model is different than a performance of a current version of the predictive model, for example, the retraining component 226 can determine whether it is worthwhile to continue retraining the predictive model or to stop retraining.

A determination can be made of whether a performance of the retrained predictive model (or partially retrained model) satisfies a threshold (310). For example, the retraining component 226 can determine a performance score change between a current version of a predictive model and a retrained predictive model. In general, the performance of a predictive model can be evaluated by assessing its precision and recall. Precision may be expressed as a fraction of instances in which a target attribute is correctly assigned by the predictive model, whereas recall may be expressed as a fraction of relevant instances that are identified by the model (e.g., instances having a particular value for the target attribute). If a predictive model were to be used for predicting for a group of machines whether a particular machine's water pump should be serviced, for example, a precision score could represent a fraction of instances in which a correct decision is made to service the water pump, whereas a recall score could represent a fraction of instances in which a machine needing service to the water pump had the water pump serviced. The threshold, for example, can be expressed as a threshold performance score increase in a precision score, a recall score, or a combined score, from a current version of the predictive model to the retrained predictive model (e.g., a percentage change, such as 1%, 2%, 5%, or another suitable value). As another example, the threshold can be expressed as a precision/recall curve shift from the current version of the predictive model to the retrained predictive model. In the present example, the retraining component 226 can determine that the performance of the partially retrained predictive model does not satisfy the threshold (e.g., the performance score did not significantly increase).

If the performance of the retrained predictive model does not satisfy the threshold, the one or more retraining rules can be updated (312). For example, if the retraining component 226 determines that a performance score (e.g., including precision and/or recall scores) of a retrained predictive model does not increase by a threshold value, the component can derive an updated rule that specifies that a condition that triggered the retraining (or partial retraining) of the predictive model is to be modified or removed. In the present example, a trigger condition associated with a change in the machine's inspection schedule may be identified as a non-factor in determining whether the machine's water pump should be serviced, thus the corresponding rule can be removed from the retraining rules 224. As another example, if a trigger condition associated with another systemic change (e.g., a change in service staff) were to be identified as a factor in determining whether the machine's water pump should be serviced, a corresponding rule can be added to the retraining rules 224, or an existing rule can be modified.

Figure 4:
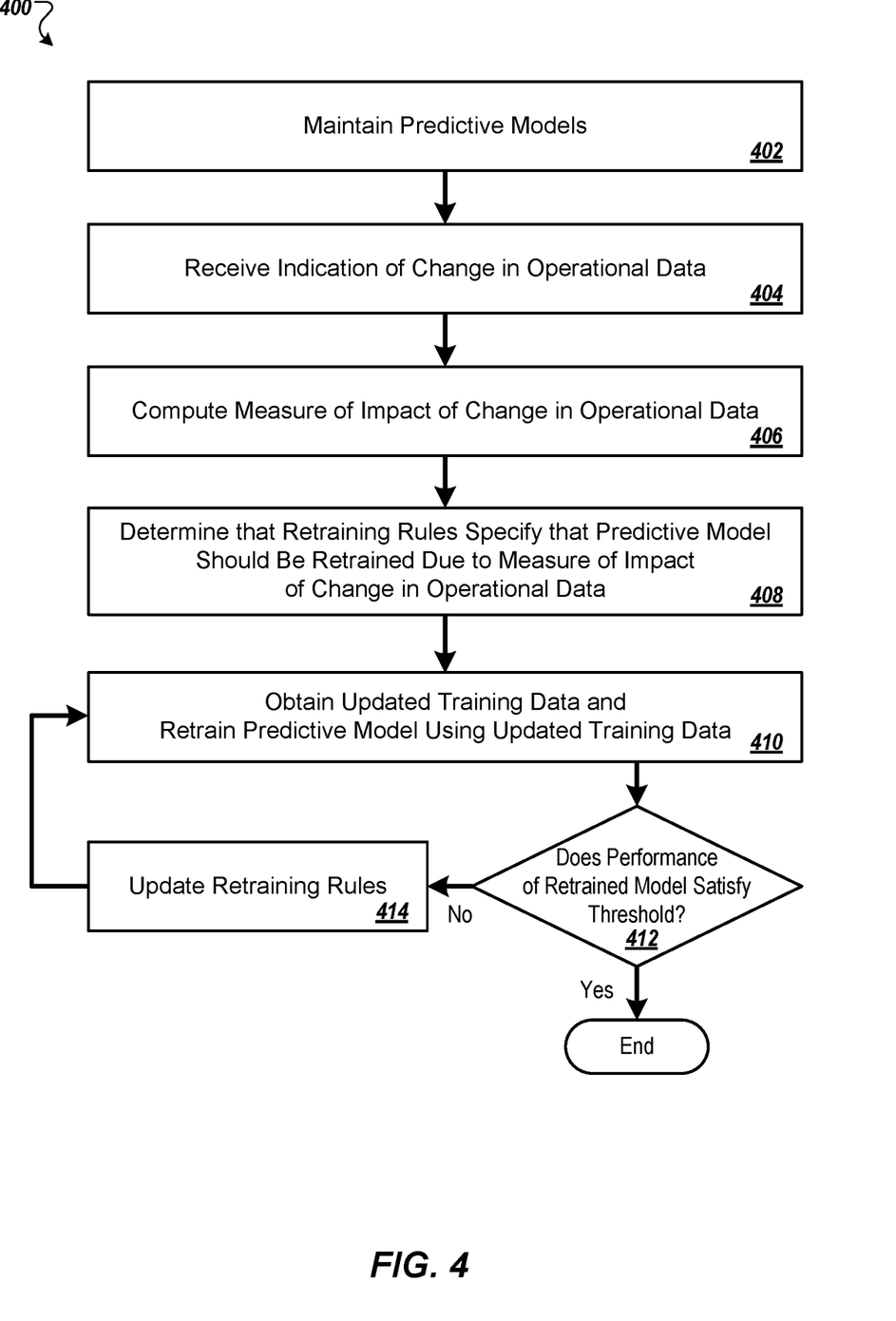
FIG. 4 depicts an example process that can be executed in implementations of the present disclosure.

FIG. 4 depicts an example process 400 that can be executed in implementations of the present disclosure. The example process 400 can be implemented by an appropriately programmed system of one or more computers, for example, by the example system 100 of FIG. 1 or example environment 200 of FIG. 2.

One or more predictive models are maintained by a computer system of an enterprise (402). For example, the predictive models 228 can be maintained by the environment 200. The computer system can apply each of the one or more predictive models to generate predictions using received operational data. For example, the server system 108 can apply the predictive models 228 to generate predictions (e.g., predictions regarding whether a particular machine's water pump should be serviced) using received operational data 204 (e.g., data pertaining to various instances of a particular type of machine in a manufacturing environment).

An indication of a change in the operational data is received (404). For example, the impact assessment component 222 can receive an indication of changes 214 in the operational data 204, such as one or more changes in shop floor data collected regarding operation of the machine and water pump (e.g., sensor data, log data), warranty data for the machine and water pump, and vendor performance data for the machine and water pump. In the present example, the indication of changes 214 in the operational data 204 can include an indication that an average value for a particular feature (e.g., operation speed) has changed (e.g., increased or decreased) across a group of machines.

A measure of impact of the change in the operational data is computed (406). For example, the impact assessment component 222 can compute the measure of impact of one or more changes 214 in the operational data 204. In some examples, computing the measure of impact of the change in the operational data can be based on one or more changes to values of features of the operational data. In general, training data used by machine learning algorithms for generating predictive models may include vectors of numbers, where the vectors of numbers represent values for respective features (e.g., machine age, machine model, sensor reading, and other relevant features). Updated operational data can be received and compared to previous training data on which the one or more predictive models had been trained. For example, measuring the impact of the change(s) 214 in the operational data 204 can include comparing current operational data to previous data on which a current version of a predictive model was trained. In the present example, a model for predicting whether a machine's water pump should be serviced may have been trained using operational data 204 in which an average value for machine operation speed was 400 RPM, whereas updated operational data indicates an average value for machine operation speed of 500 RPM.

A determination is made that one or more retraining rules specify that at least one of the one or more predictive models should be retrained due to the measure of impact of the change in the operational data (408). For example, the impact assessment component 222 can determine that one or more of the retraining rules 224 specify that at least one of the predictive models 228 should be retrained, due to the change(s) 214 in the operational data 204 being relevant to one or more features of the model (e.g., machine age, machine model, sensor reading), and due to an extent of the change(s) 214 having a particular value or range of values (e.g., numeric values, percentages, or other suitable expressions of an extent of the change). As another example, the impact assessment component 222 can determine that at least one of the predictive models should be retrained, due to one or more of the change(s) 214 being of a particular type (e.g., a change in categorization). In the present example, the retraining rules 224 may include a rule that specifies that if an average value for operation speed of a group of machines changes by a particular value (e.g., at least 20%), that the model for predicting whether a machine's water pump should be serviced should be retrained.

In response to the determination, updated training data is obtained and the predictive model is retrained using the updated training data (410). Similar to (308) of the example process 300, for example, the retraining component 226 can receive updated training data, and one or more of the predictive models 228 can be retrained using the updated training data. Obtaining updated training data may include gathering new training examples from operational data that has changed from previously received operational data. For example, the retraining component 226 can gather new training examples from the operational data 204 that have changed from previously received operational data (e.g., data that was used to train a current version of the predictive model). In the present example, the retraining component 226 can gather new training examples related to current operation of the machine, or related to operation of the machine that occurred since the rule for retraining the predictive model was triggered (e.g., since the average value for operation speed of the group of machines changed). Retrained predictive models may be stored (e.g., in the repository of predictive models 228) and/or may be evaluated to determine whether any related retraining rules 224 should be added, removed, or updated.

In some examples, retraining the predictive model using the updated training data can include partially retraining the predictive model and assessing a performance of the partially retrained predictive model. Fully retraining a predictive model, for example, may be time and resource intensive. By partially retraining the predictive model and determining whether a performance of the partially retrained model is different than a performance of a current version of the predictive model, for example, the retraining component 226 can determine whether it is worthwhile to continue retraining the predictive model or to stop retraining.

A determination can be made of whether a performance of the retrained predictive model satisfies a threshold (412). Similar to (310) of the example process 300, for example, the retraining component 226 can determine a performance score change between a current version of a predictive model and a retrained predictive model. In the present example, the retraining component 226 can determine that the performance of the partially retrained predictive model does not satisfy the threshold (e.g., the performance score did not significantly increase).

If the performance of the retrained predictive model does not satisfy the threshold, the one or more retraining rules can be updated (414). Similar to (312) of the example process 300, for example, if the retraining component 226 determines that a performance score (e.g., including precision and/or recall scores) of a retrained predictive model does not increase by a threshold value, the component can derive an updated rule that specifies that a condition that triggered the retraining (or partial retraining) of the predictive model is to be modified or removed. In some examples, one or more retraining rules may be retrained, based on the measure of impact of the change in the operational data. In the present example, a trigger condition associated with a change in average value for operation speed of a group of machines (e.g., an average operation speed increase of at least 20%) may be identified as a non-factor in determining whether the machine's water pump should be serviced, thus the corresponding rule in the retraining rules 224 can be modified. For example, the retraining component 226 can modify the trigger condition of the rule (e.g., increase or decrease the trigger condition by a particular percentage, such as 10%, 20%, 50%, or another suitable value), and the updated rule can be used by the impact assessment component 222 when determining that related predictive models should be retrained in subsequent cases. Thus, rules can be evolve over time based on the results of retraining experiments.

As retraining predictive models may be a time and labor-intensive process, objectively and automatically determining whether a predictive model is likely to benefit from retraining can save time and labor. Rather than add features (and complexity) to a predictive model, the model can be retrained at appropriate times. A predictive model can be partially retrained and a performance of the partially retrained model can be evaluated to determine whether it is worthwhile to use human and computer resources to fully retrain the model. A risk of applying obsolete models can be reduced.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method comprising:
maintaining, by a computer system of an enterprise, one or more predictive models, wherein the one or more predictive models have been training using operational data that pertains to ongoing operational performance of the enterprise;
receiving an indication of a systemic change in the computer system of the enterprise, the systemic change comprising a change in data governance policies or business data of the enterprise, wherein the systemic change is not a change to the operational data used to train the one or more predictive models, and the systemic change has not been generated as a prediction using the one or more predictive models;
in response to receiving the indication of the systemic change, determining that one or more retraining rules specify that at least one of the one or more predictive models should be retrained due to the systemic change; and
in response, obtaining updated training data and retraining the predictive model using the updated training data, wherein the updated training data includes only operational data that pertains to ongoing operational performance of the enterprise.

2. The method of claim 1, wherein data governance policies of the enterprise comprise data definitions of data elements of the operational data, data quality standards of the operational data, and processes for data management of the operational data that pertains to ongoing operational performance of the enterprise, the data governance policies not having been used to train the one or more predictive models.

3. The method of claim 1, wherein the business data is related to aspects of the operational data that pertains to ongoing operational performance of the enterprise, but has not been used to train the one or more predictive models.

4. The method of claim 1, further comprising determining whether a performance of the retrained predictive model satisfies a threshold.

5. The method of claim 4, wherein the performance of the retrained predictive model does not satisfy the threshold, the method further comprising updating the one or more retraining rules.

6. The method of claim 1, wherein retraining the predictive model using the updated training data comprises partially retraining the predictive model and assessing a performance of the partially retrained predictive model.

7. The method of claim 1, wherein obtaining updated training data comprises gathering new training examples from operational data that has changed from operational data that was previously used to train the one or more predictive models.

8. The method of claim 1, wherein the enterprise is a manufacturing enterprise, the operational data pertains to ongoing operation of a machine of the manufacturing enterprise, and the business data indicates a supplier change of a part of the machine.

9. The method of claim 1, wherein the enterprise is a financing enterprise, the operational data pertains to ongoing payment and collection operations of the financing enterprise, and the business data indicates a regulatory change that impacts the financing enterprise.

10. The method of claim 1, wherein the enterprise is a sales enterprise, the operational data pertains to ongoing channel performance of the sales enterprise, and the business data indicates a customer base change of the sales enterprise.

11. A computer-implemented method comprising:
maintaining, by a computer system of an enterprise, one or more predictive models, wherein the computer system uses each of the one or more predictive models to generate predictions using received operational data that pertains to ongoing operational performance of the enterprise;
receiving an indication of a change in the operational data;
computing a measure of impact of the change in the operational data, wherein computing the measure of impact of the change in the operational data includes (i) receiving updated operational data, and (ii) comparing the updated operational data to previous training data on which the one or more predictive models had been trained, the measure of impact being based on one or more changes to values of features of the operational data different from the generated predictions;
determining that one or more retraining rules specify that at least one of the one or more predictive models should be retrained due to the measure of impact of the change in the operational data; and
in response, (i) obtaining updated training data, (ii) partially retraining the predictive model using the updated training data, (iii) assessing performance of the partially retrained model, and (iv) in response to determining that performance of the partially retrained model is different than performance of a current version of the at least one of the one or more predictive models, continuing to retrain the predictive model.

12. The method of claim 11, further comprising updating the one or more retraining rules, based on the measure of impact of the change in the operational data.

13. The method of claim 11, further comprising determining whether a performance of the retrained predictive model satisfies a threshold.

14. The method of claim 13, wherein the performance of the retrained predictive model does not satisfy the threshold, the method further comprising updating the one or more retraining rules.

15. The method of claim 11, wherein obtaining updated training data comprises gathering new training examples from operational data that has changed from previously received operational data.

16. The method of claim 11, wherein the measure of the impact of the change in the operational data indicates that an extent of the change in the operational data meets a particular value or is within a particular range of values.

17. A computer program product, encoded on one or more non-transitory computer storage media, comprising instructions that when executed by one or more computers cause the one or more computers to perform operations comprising:

maintaining, by a computer system of an enterprise, one or more predictive models, wherein the one or more predictive models have been trained using operational data that pertains to ongoing operational performance of the enterprise;

receiving an indication of a systemic change in the computer system of the enterprise, the systemic change comprising a change in data governance policies or business data of the enterprise, wherein the systemic change is not a change to the operational data used to train the one or more predictive models, and the systemic change has not been generated as a prediction using the one or more predictive models;

in response to receiving the indication of the systemic change, determining that one or more retraining rules specify that at least one of the one or more predictive models should be retrained due to the systemic change; and in response, obtaining updated training data and retraining the predictive model using the updated training data, wherein the updated training data includes only operational data that pertains to ongoing operational performance of the enterprise.

18. The computer program product of claim 17, the operations further comprising determining whether a performance of the retrained predictive model satisfies a threshold, wherein the performance of the retrained predictive model does not satisfy the threshold, the operations further comprise updating the one or more retraining rules.

19. The computer program product of claim 17, wherein retraining the predictive model using the updated training data comprises partially retraining the predictive model and assessing a performance of the partially retrained predictive model.

20. The computer program product of claim 17, wherein obtaining updated training data comprises gathering new training examples from operational data that has changed from operational data that was previously used to train the one or more predictive models.

* * * * *